(12) United States Patent
Lee

(10) Patent No.: US 9,683,873 B2
(45) Date of Patent: Jun. 20, 2017

(54) TORQUE SENSOR COVER

(71) Applicant: Mando Corporation, Pyeongtaek-si (KR)

(72) Inventor: Je Ho Lee, Yongin-si (KR)

(73) Assignee: MANDO CORPORATION, Gyeonggi Do (KR)

(*) Notice: Subject to any disclaimer, the term of this patent is extended or adjusted under 35 U.S.C. 154(b) by 90 days.

(21) Appl. No.: 14/308,309

(22) Filed: Jun. 18, 2014

(65) Prior Publication Data
US 2015/0168183 A1 Jun. 18, 2015

(30) Foreign Application Priority Data
Dec. 13, 2013 (KR) .......... 10-2013-0155290

(51) Int. Cl.
| | | |
|---|---|---|
| *G01D 11/24* | (2006.01) | |
| *B29C 45/00* | (2006.01) | |
| *B62D 6/10* | (2006.01) | |
| *B29L 31/00* | (2006.01) | |
| *G01L 3/00* | (2006.01) | |

(52) U.S. Cl.
CPC .......... *G01D 11/245* (2013.01); *B29C 45/00* (2013.01); *B29L 2031/752* (2013.01); *G01L 3/00* (2013.01)

(58) Field of Classification Search
CPC ................. G01D 11/24; B29C 45/00
USPC ........................................ 73/431
See application file for complete search history.

(56) References Cited

U.S. PATENT DOCUMENTS

| | | | | |
|---|---|---|---|---|
| 5,836,419 | A * | 11/1998 | Shimizu | B62D 5/0403 180/443 |
| 7,290,638 | B2 * | 11/2007 | Shiino | B62D 5/04 180/444 |
| 2003/0167857 | A1 * | 9/2003 | Sugimura | G01L 3/104 73/862.333 |
| 2005/0257992 | A1 | 11/2005 | Shiino et al. | |
| 2011/0315442 | A1 * | 12/2011 | Nolting | H01R 13/506 174/652 |

FOREIGN PATENT DOCUMENTS

| | | | |
|---|---|---|---|
| CN | 200964129 | 10/2007 | |
| CN | 102273019 | 12/2011 | |
| CN | 103144666 | 6/2013 | |
| DE | 20 2009 000 899 | 7/2010 | |
| DE | 10 2012 023 751 | 6/2013 | |
| DE | 10 2012 103 052 | 10/2013 | |
| EP | 2 749 856 | 7/2014 | |
| KR | DE 102012023751 A1 * | 6/2013 | ............ B62D 6/10 |

OTHER PUBLICATIONS

Office Action dated Oct. 1, 2015 for German Patent Application No. 10 2014 009 103.1.
Office Action dated Aug. 2, 2016 for Chinese Patent Application No. 201410272027.6.

* cited by examiner

*Primary Examiner* — Lisa Caputo
*Assistant Examiner* — Jamel Williams
(74) *Attorney, Agent, or Firm* — Ladas & Parry, LLP

(57) ABSTRACT

The present invention relates to a torque sensor cover. According to an embodiment of the present invention, as a second cover is formed of plastic through injection-molding, costs and weight can be reduced as compared with a wire cover manufactured of aluminum through casting according to the related art.

6 Claims, 5 Drawing Sheets

TORQUE SENSOR COVER

CROSS-REFERENCE TO RELATED APPLICATION

This application claims priority from and the benefit under 35 U.S.C. §119(a) of Korean Patent Application No. 10-2013-0155290, filed on Dec. 13, 2013, which is hereby incorporated by reference for all purposes as if fully set forth herein.

BACKGROUND OF THE INVENTION

1. Field of the Invention

The present invention relates to a torque sensor cover, and more particularly to a torque sensor cover manufacturing method through which costs can be reduced, weight can be reduced, assembly time can be reduced, and an assembly structure thereof can be simplified as compared with a wire cover manufactured of aluminum through casting according to the related art.

2. Description of the Prior Art

Hydraulic power steering apparatuses using hydraulic pressure from a hydraulic pump are generally used as auxiliary power steering apparatuses for vehicles, but recently, electric power steering apparatuses using a motor have gradually become more commonly used.

FIG. 1 is an exploded perspective view showing a part of a rack-driven auxiliary power steering apparatus according to the related art.

As shown in FIG. 1, the rack-driven auxiliary power steering apparatus according to the related art includes a rack bar 101 extending in the transverse direction of a vehicle and having a rack gear at one side of an outer peripheral surface thereof, a pinion shaft 103 having a pinion gear engaged with the rack gear, a torque sensor 107 coupled to the pinion shaft 103, and a rack housing 105 in which the rack bar 101, the pinion shaft 103, and the torque sensor 107 are installed.

In the rack-driven auxiliary power steering apparatus according to the related art, the pinion shaft 103 and the torque sensor 107 are coupled to the rack housing 105, a connector 111 of a wire harness 109 inserted into one side of the rack housing 105 is coupled to a torque sensor 107, and the wire harness 109 is inserted into the rack housing 105 through a wire cover 119 fixed to the rack housing 105 using a fixing bolt 121.

If the pinion shaft 103 and the torque sensor 107 are coupled to the rack housing 105, a rack housing cover 115 in which a seal member 113 is coupled to an upper side thereof is coupled to the rack housing 105 by a coupling member 117.

However, in the rack-driven auxiliary power steering apparatus according to the related art, because the wire cover is coupled to the rack housing using the fixing bolt, assembly time is long and an assembly structure thereof is complex.

Further, because the wire cover is manufactured of aluminum through casting, an additional process such as a machining process is necessary after the manufacturing thereof so that both costs and product time increase.

SUMMARY OF THE INVENTION

The present invention has been made in an effort to solve the above-mentioned problems, and the present invention provides a torque sensor cover through which costs can be reduced, weight can be reduced, assembly time can be reduced, and an assembly structure thereof can be simplified as compared with a wire cover manufactured of aluminum through casting according to the related art.

The objects of the present invention are not limited thereto, and other unmentioned objects will be clearly understood by those skilled in the art from the following description.

In accordance with an aspect of the present invention, there is provided a torque sensor cover including: a first cover surrounding a steering shaft to which a torque sensor is coupled and having a through-hole through which an electric wire connected to the torque sensor passes at one side thereof; a support member coupled to and supported by an inner peripheral surface of the through-hole and having a hole through which the electric wire passes; and a second cover detachably coupled to the first cover, for axially pressing and supporting the support member.

According to an embodiment of the present invention, as a second cover is formed of plastic through injection-molding, costs and weight can be reduced as compared with a wire cover manufactured of aluminum through casting according to the related art.

Further, because the first cover and the second cover are coupled to or separated from each other through the coupling boss of the guide protrusion and the coupling hole of the second cover, assembly time can be reduced and the assembly structure can be simplified.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, when some embodiments are described with reference to the exemplary drawings, it should be noted that if it is described in the specification that one component is "connected," "coupled" or "joined" to another component, a third component may be "connected," "coupled," and "joined" between the first and second components, although the first component may be directly connected, coupled or joined to the second component.

Hereinafter, an example in which a torque sensor cover according to the present invention is mounted to a rack-driven auxiliary power steering apparatus will be described.

Figure 2:
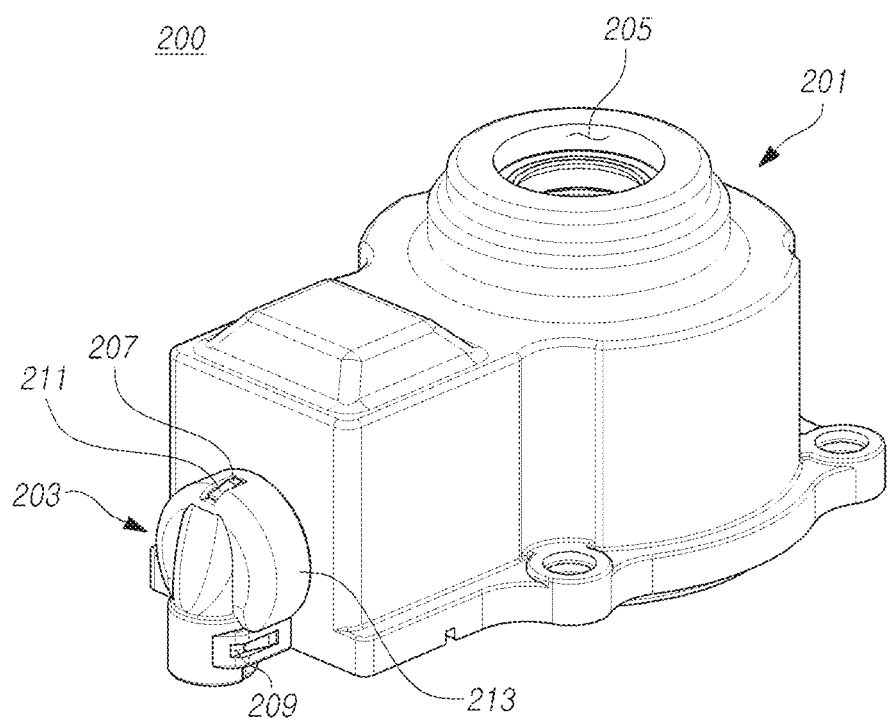
FIGS. 2 and 3 are perspective views of a torque sensor cover according to an embodiment of the present invention.
Figure 3:
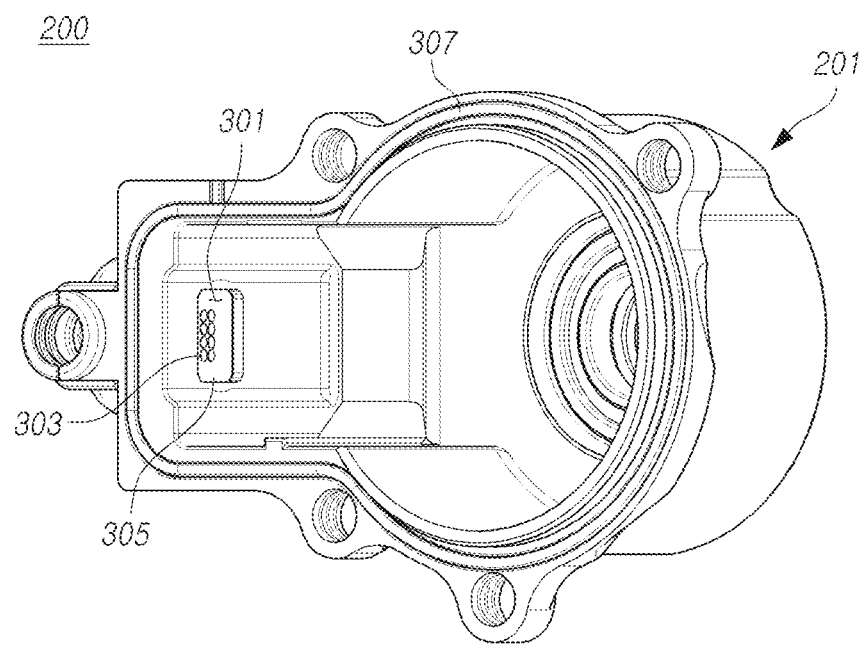
Figure 4:
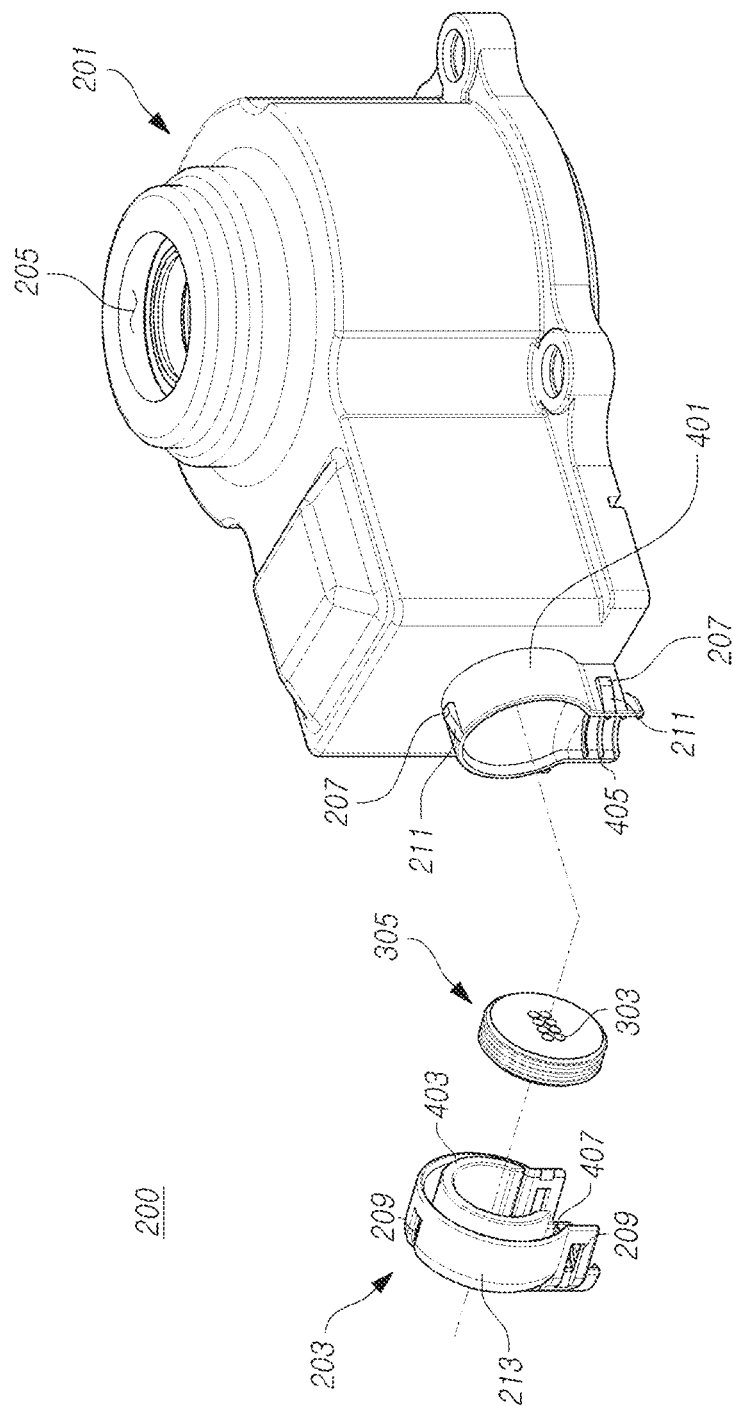
FIG. 4 is an exploded perspective view of FIG. 2.
Figure 5:
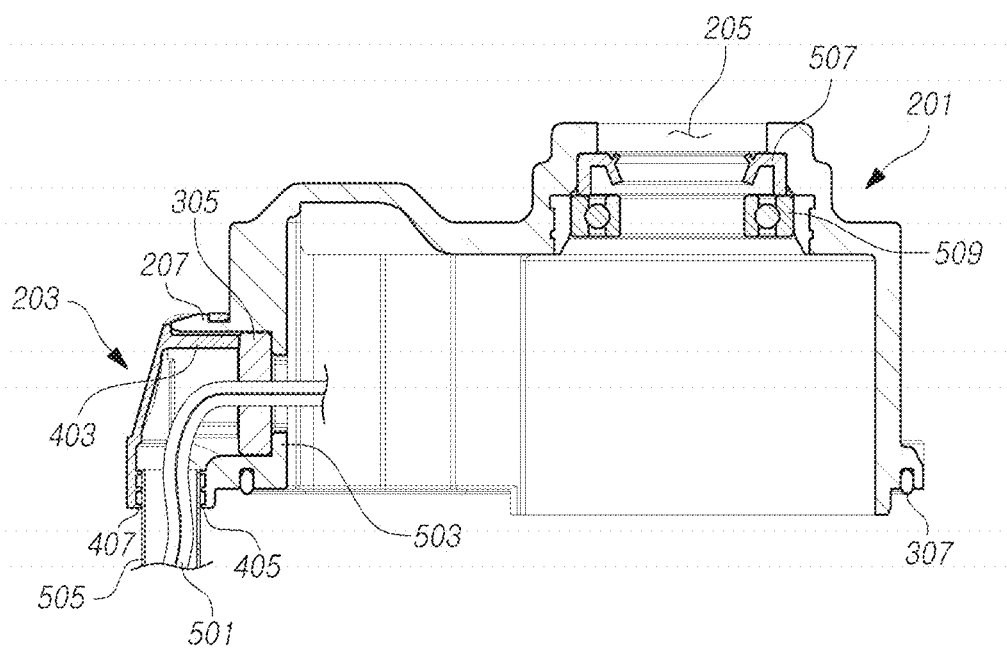
FIG. 5 is a sectional view of a state in which a guide tube is coupled to the torque sensor cover.

FIGS. 2 and 3 are perspective views of a torque sensor cover according to an embodiment of the present invention. FIG. 4 is an exploded perspective view of FIG. 2. FIG. 5 is a sectional view of a state in which a guide tube is coupled to the torque sensor cover of FIG. 2.

Figure 1:
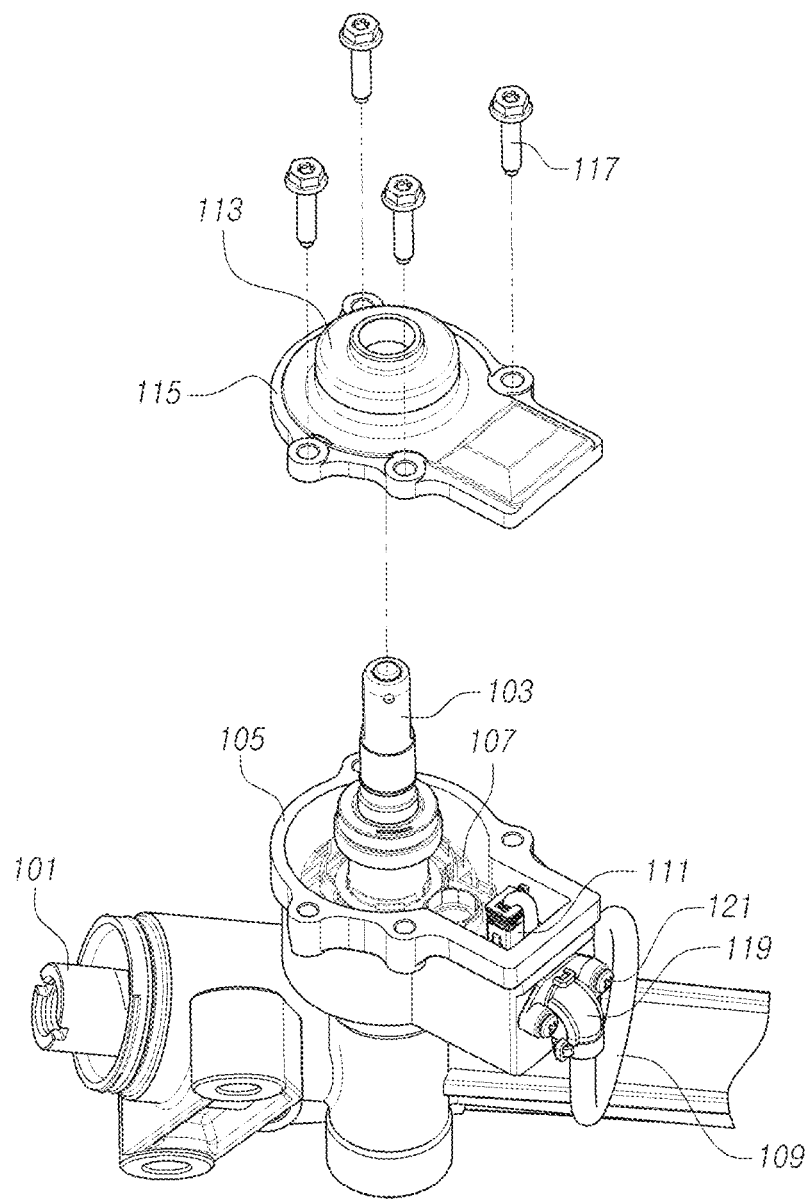
FIG. 1 is an exploded perspective view showing a part of a rack-driven auxiliary power steering apparatus according to the related art.

Referring to FIG. 1 together with the drawings, the torque sensor cover 200 according to the embodiment of the present invention includes: a first cover 201 surrounding a steering shaft (corresponding to a pinion shaft 103) to which a torque sensor 107 is coupled and having a through-hole 301 through which an electric wire 501 connected to the torque sensor 107 passes at one side thereof; a support member 305 supported by an inner peripheral surface of the through-hole 301 and having a hole 303 through which the electric wire 501 passes; and a second cover 203 detachably coupled to the first cover 201, for axially pressing and supporting the support member 305.

The first cover 201 is provided to surround the steering shaft to which the torque sensor 107 is coupled, and, for example, the first cover 201 is coupled to a rack housing 105.

Meanwhile, a lower portion of the first cover 201 is opened and a communication hole 205 is formed at an upper portion of the first cover 201 such that the steering shaft may protrude to the outside of the first cover 201 through the communication hole 205, and a cover member 507 coupled to an outer peripheral surface of the steering shaft and a bearing member 509 are sequentially coupled downwards to the communication hole 205 to be supported by the communication hole 205.

The through-hole 301 through which the electric wire 501 connected to the torque sensor 107 passes is formed at one side of the first cover 201, and a guide protrusion 401 further protruding to the outside is formed at a periphery of the through-hole 301.

The guide protrusion 401 is formed such that a side facing a second cover 203, which will be described below, and a side facing the lower side are opened, and a coupling boss 207 is further formed on an outer peripheral surface of the guide protrusion 401.

Because the coupling boss 207 is formed in the guide protrusion 401 such that when the second cover 203 is coupled to the guide protrusion 401, the second cover 203 and the guide protrusion 401 may be firmly coupled to each other as the coupling boss 207 is inserted into a coupling hole 209, which will be described below, and when the second cover 203 is separated from the guide protrusion 401, the second cover 203 may be extracted from the guide protrusion 401 while the coupling boss 207 is pressed, the second cover 203 may be conveniently attached to and detached from the guide protrusion 401.

Meanwhile, an inclined tapered surface 211 may be formed in the above-described coupling boss 207 such that an outwardly protruding height of the inclined tapered surface 211 decreases as it goes toward the second cover 203, and as the tapered surface 211 is formed in the coupling boss 207, the coupling boss 207 is smoothly slid along an inner peripheral surface of an outer body 213 of the second cover 203 and then is inserted into the coupling hole 209 when the second cover 203 is coupled to the guide protrusion 401.

A step 503 protruding further to the inside may be formed in the through-hole 301 of the first cover 201 to support one side surface of the support member 305, which will be described below, and as the step 503 is formed in the through-hole 301, the support member 305 may be stably fixed in the through-hole 301.

A plurality of support bosses 405 are further formed on an inner peripheral surface of the lower side of the guide protrusion 401 such that the support bosses 405 support an outer peripheral surface of the guide tube 505 together with the plurality of support bosses 407 formed on an inner peripheral surface of the lower side of the outer body 213 of the second cover 203, which will be described below, and the guide tube 505 is connected to the torque sensor 107 to guide the electric wire 501 extracted to the outside of the torque sensor cover 200.

Meanwhile, a seal member 307 is further provided on a lower surface of the first cover 201, in which case the lower surface of the first cover 201 refers to a surface facing a peripheral surface of an opened portion of the rack housing 105, and because the seal member 307 is provided on the lower surface of the first cover 201, a water tightness between the first cover 201 and the rack housing 105 is improved when the first cover 201 is coupled to the rack housing 105.

Thereafter, the support member 305 is coupled to and supported by an inner peripheral surface of the through-hole 301, and the support member 305 is formed of a resilient material.

A plurality of holes 303 are formed in the support member 305, and the electric wire 501 connected to the torque sensor 107 passes through the holes 303 to extend to the outside.

An outer peripheral surface of the support member 305 is formed of a convexo-concave structure.

Thereafter, the second cover 203 is detachably coupled to the first cover 201, and the second cover 203 may be formed of plastic through injection-molding, which helps to reduce costs and weight, such that when the second cover 203 is mounted to the first cover 201, the above-described support member 305 is axially pressed and supported by the second cover 203.

In a detailed description of the structure of the second cover 203, the second cover 203 includes: an inner body 403 inserted into the guide protrusion 401, for axially pressing the support member 305; and an outer body 213 spaced outwards from the inner body 403 and surrounding an outer peripheral surface of the guide protrusion 401.

The second cover 203 is structured as a whole such that a side thereof facing the first cover 201 and a lower side are opened, and an outer diameter of the inner body 403 of the second cover 203 is smaller than an inner diameter of the guide protrusion 401 such that the inner body 403 of the second cover 203 is inserted into the guide protrusion 401 and the inner body 403 inserted into the guide protrusion 401 axially (that is, in a direction in which the second cover 203 is coupled to the guide protrusion 401) presses the above-described support member 305 to attach the support member 305 to the step 503 so that the introduction of foreign substances into the torque sensor cover 200 through the through-hole 301 can be prevented.

The outer body 213 is spaced outwards from the inner body 403 and surrounds an outer peripheral surface of the guide protrusion 401. That is, the guide protrusion 401 is inserted into a space between the inner body 403 and the outer body 213.

Meanwhile, as described above, the coupling hole 209 is formed in the outer body 213 such that the coupling boss 207 may be inserted into and coupled to the coupling hole 209, and as described above, the support boss 407 is formed on an inner peripheral surface of the lower side of the outer body 213.

A process of mounting the torque sensor cover according to the embodiment of the present invention will be described with reference to the drawings.

First, after extracting the electric wire 501 connected to the torque sensor 107 through the hole 303 of the support member 305, the operator inserts the support member 305 into the through-hole 301 of the first cover 201.

Then, one side surface of the support member 305 is supported by the step 503 of the through-hole 301.

Thereafter, the second cover 203 is coupled to the guide protrusion 401 of the first cover 201, in which case the guide protrusion 401 is inserted into a space between the outer body 213 and the inner body 403 of the second cover 203 and the coupling boss 207 of the guide protrusion 401 pushes the second cover 203 until the second cover 203 is inserted into the coupling hole 209 of the outer body 213.

Of course, the guide tube 505, in which the electric wire 501 is guided, is disposed between the second cover 203 and the guide protrusion 401 to be fixedly supported by the support bosses 405 of the guide protrusion 401 and the support bosses 407 formed in the outer body 213 of the second cover 203.

Thereafter, if the coupling boss 207 is completely inserted into the coupling hole 209, the second cover 203 and the guide protrusion 401 are completely coupled to each other, and when it is necessary to separate the second cover 203 from the guide protrusion 401 later, the second cover 203 can be conveniently extracted from the guide protrusion 401 while the coupling boss 207 is pressed.

As described above, according to the embodiment of the present invention, because the second cover is formed of plastic through injection-molding, costs and weight can be reduced as compared with the wire cover manufactured of aluminum through casting according to the related art.

Further, because the first cover and the second cover are coupled to or separated from each other through the coupling boss of the guide protrusion and the coupling hole of the second cover, assembly time can be reduced and the assembly structure can be simplified.

Even if it was described above that all of the components of an embodiment of the present invention are coupled as a single unit or coupled to be operated as a single unit, the present invention is not necessarily limited to such an embodiment. The scope of the present invention shall be construed on the basis of the accompanying claims in such a manner that all of the technical ideas included within the scope equivalent to the claims belong to the present invention.

What is claimed is:

1. A torque sensor cover comprising:
   a first cover surrounding a steering shaft to which a torque sensor is coupled and having a through-hole through which an electric wire connected to the torque sensor passes at one side thereof;
   a support member coupled to and supported by an inner peripheral surface of the through-hole of the first cover and having a hole through which the electric wire passes; and
   a second cover detachably coupled to the first cover, axially pressing and supporting the support member,
   wherein a guide protrusion protruding outwards is formed at a periphery of the through-hole of the first cover,
   wherein the second cover comprises an inner body inserted into the guide protrusion, for axially pressing the support member, and an outer body spaced outwards from the inner body and surrounding an outer peripheral surface of the guide protrusion,
   wherein a coupling boss is formed on an outer peripheral surface of the guide protrusion, and
   wherein a coupling hole into which the coupling boss is inserted to be coupled to the coupling hole is further formed in the outer body.

2. The torque sensor cover of claim 1, wherein a step is formed in the through-hole of the first cover to protrude inwards such that the step supports one side surface of the support member.

3. The torque sensor cover of claim 1, wherein an inclined tapered surface is formed in the coupling boss such that an outwardly protruding height of the inclined tapered surface decreases as it goes toward the second cover.

4. The torque sensor cover of claim 1, wherein a seal member is provided on a lower surface of the first cover.

5. The torque sensor cover of claim 1, wherein the second cover is formed of plastic through injection-molding.

6. The torque sensor cover of claim 1, wherein a seal member is provided on a lower part of the first cover.

* * * * *